Oct. 18, 1955     D. E. CROOKER     2,720,906
TRACTION COILS FOR VEHICLE TIRES
Filed Nov. 20, 1952
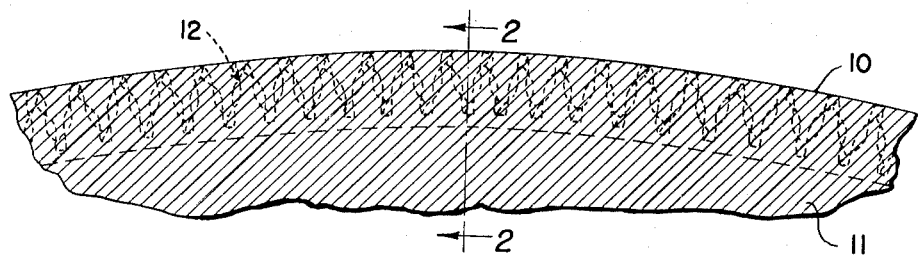
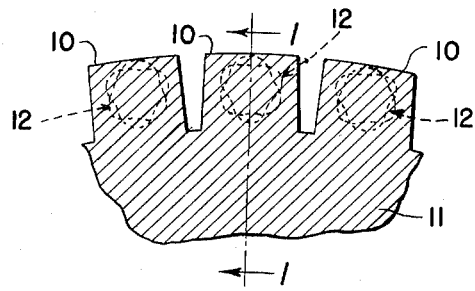
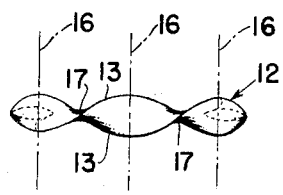
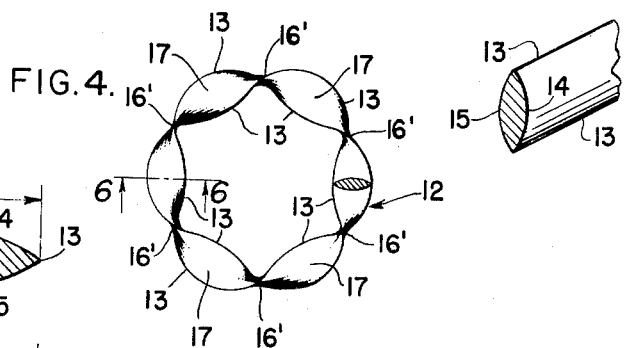
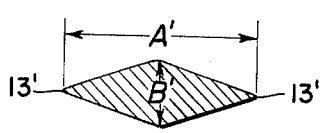
INVENTOR.
David E. Crooker
BY
Morsell & Morsell
Attorneys

United States Patent Office 2,720,906
Patented Oct. 18, 1955

2,720,906

TRACTION COILS FOR VEHICLE TIRES

David E. Crooker, Ontonagon, Mich., assignor of one-half to Lloyd L. Felker, Marshfield, Wis.

Application November 20, 1952, Serial No. 321,621

1 Claim. (Cl. 152—211)

This invention relates to improvements in traction coils for vehicle tires.

In my prior Patent No. 2,479,474, dated August 16, 1949, coils of wire which are molded into the rider strips of a tire are illustrated. In order to prevent displacement of coil portions after the coil has been worn into a multiplicity of staple-like elements, it is proposed in this prior patent to employ corrugated wire for the coil. In this type of construction great care has to be exercised in the corrugating process to prevent weakening or rupturing of the wire. Otherwise it will break prematurely in use. By exercising care in the corrugating process it has been found to be entirely practical to provide coils in the form disclosed in the before-mentioned patent, said coils are in general suitable for use in passenger car tires. In truck tires, however, wire of greater strength is required.

It is not practical to corrugate round wire which is of substantially greater cross-sectional diameter than that which has heretofore been employed for passenger car tires, and therefore the construction shown in my Patent No. 2,479,474 has not been satisfactory for truck tire use. In order to provide wire coils which will withstand the stresses which are encountered in heavy duty truck work, the type of coil shown in my Patent No. 2,557,945 was devised wherein the coils are formed of two stiff twisted-together solid wires. Thus for truck tires, each strand may be of substantially the same cross-sectional diameter as the strand of wire which is used in the coils of passenger car tires, but by using two of said strands twisted together, the resulting coil can be successfully formed and the strands of the coils will brace one another to withstand the stresses encountered in truck tires. These coils, however, which are formed of two twisted-together strands are relatively expensive to produce.

In addition to the above, tires equipped with coils as heretofore developed, have been subject to the objection that until the side portion of the wires in contact with the road bed have been worn away to form a plurality of staples, there is little improvement in road-gripping action.

It is, therefore, a general object of the present invention to provide an improved traction coil, designed for use in a tire, which is capable of providing increased traction during the normal "wearing-in" period and at the instant a new tire is first put in use.

It is a further object of the invention to provide a traction coil of the class described, suitable for use in truck tires, wherein the strands are so shaped in cross section, that it is practical to form a single strand of wire, strong enough for truck work, with irregularities of a type which will interlock with the rubber of the tire and prevent displacement, said shape of the strand also permitting successful coiling without any weakening or fracturing of the strand.

A further, more specific object of the invention is to provide a traction coil of the class described wherein the strand of wire from which it is formed is lenticular in transverse cross-section thus providing a pair of oppositely directed knife edges which impart greatly improved traction characteristics to a tire, which characteristics are effective as soon as the tire is put to use.

A further specific object of the invention is to provide a traction coil as above described, wherein the coiling is performed by causing the wire to bend transversely on those relatively thin portions of the strand which are between the twists so that the flexing takes place across the smaller cross sectional dimension to prevent weakening of the strands.

A further object of the invention is to provide an improved traction coil wherein the strand from which it is formed has a thickness midway of its width which is substantially equal to the diameter of one of the round strands heretofore used in coils designed for passenger car tires, and wherein the width of said improved strand is preferably three times as great as said thickness, thus providing sufficient strength for use in truck tires, while providing a strand which can flex at spaced points during coiling without becoming weakened or ruptured.

A further object of the invention is to provide an improved method of manufacturing traction coils which results in uniform processing.

Other objects of the invention are to provide a traction coil, suitable for heavy duty work, which is less expensive than a coil formed of two strands.

With the above and other objects in view, the invention consists of the improved traction coil and method of manufacturing the same, and all of its parts and combinations, as set forth in the claim, and all equivalents thereof.

In the accompanying drawing, illustrating one complete embodiment of the preferred form of the invention, in which the same reference numerals designate the same parts in all of the views:

Fig. 1 is a fragmentary longitudinal vertical sectional view through the rider strip portion of a tire embodying the improved traction coils, the view being taken along the line 1—1 of Fig. 2;

Fig. 2 is a fragmentary transverse sectional view of a tire taken along the line 2—2 of Fig. 1;

Fig. 3 is a top view of one of the convolutions of one of the improved coils;

Fig. 4 is an end view of a convolution of a coil;

Fig. 5 is a perspective view showing a short length of a strand of wire of the type used in the improved coil before the strand is twisted and before it is coiled;

Fig. 6 is an enlarged transverse sectional view taken along line 6—6 of Fig. 4; and Fig. 7 is a transverse sectional view taken through a modified form of wire.

Referring more particularly to the drawing, the numeral 10 designates the tread and rider strips of a tire, which strips conventionally run in a circumferential direction. The rider strips project from the tread stock of a tire 11, and may be formed either by a retreading process or during the manufacture of a new tire.

Extending longitudinally in each rider strip is one of the improved coils 12. These coils are formed from hard, stiff, wear resistant wire stock having the cross sectional shape which is illustrated in Figs. 5 and 6. To carry out the present invention it is important that the strand of wire have a cross section of the type shown in Fig. 6 or 7 and have opposite knife edges 13 which define the breadth of the strand as is indicated by the letter A in Fig. 6. The strand is preferably lenticular in transverse cross-section, having opposed convex surfaces 14 and 15 which meet at the edges 13. The thickness of the strand at the line B in Fig. 6, is preferably substantially less than the breadth, and in the preferred form the breadth is equal to three times the thickness B.

The strand of wire of the type shown in Figs. 5 and 6 is first axially twisted in a controlled manner to produce relatively loose twists of predetermined uniform length.

The twisted wire is then formed into a helical coil as shown in Fig. 4. For truck tire use the outside diameter of the helical coil is preferably not less than one-half inch. For passenger car use the outside diameter of the helical coil is preferably no greater than .375 inch.

The twisting is so performed with relation to the diameter of the coil which is to be produced that there are at least three bends in the wire in each convolution of the coil. These bends occur at spaced portions 16' where the transverse axes 16 of the broad face portions extend in the same general direction as the axis of the coil. In between each of the bends 16' there is a 180° twist as indicated at 17 where the broad face portions are in planes at right angles to the axis of the coil. In the preferred form of the invention there are six of the bends 16' for each convolution, so that each convolution is substantially hexagonal in outline as shown in Fig. 4.

By having the strands twisted in the manner shown and described, coiling of the twisted strand can take place without difficulty because the coiling results from the bending at the points 16'. Furthermore, inasmuch as the twisted arrangement is such that these bends are across the short dimension of the wire, the wire is coiled without any strain on the wire or undue weakening which might occur if the coiling caused the strand to deflect at other places than at the places 16'. The advantageous result occurs because of the use of strands having the special cross section shown in Figs. 5 and 6, together with the controlled twisting, which twisting has special relationship with the convolutions of the coils.

The coils 12 may be molded in the rider strips as shown in Figs. 1 and 2, with the coils completely accommodated in the rider strips, and with the outer portions of the convolutions located at the wearing surface of the rider strips.

Due to the novel cross-sectional shape of the wire from which the improved coils are made, the coils have the knife edges 13 to bite into the road and provide augmented traction as soon as the tire is put into use. Heretofore it has been necessary to wear away side portions of the coils to produce a multiplicity of staples before improved traction could be obtained. Tires equipped with the improved coils provide greatly augmented traction throughout their useful life, and beginning with the first day of use.

After a period of wear, those side portions of the improved coils which are in contact with the road bed wear away to produce a multiplicity of staples, and the irregularities produced by the twisting interlock with the rubber prevent the staples from working out of the tire during use.

The improved invention provides a simple method of forming a very strong coiled wire, and these coils are especially adapted for heavy duty work such as in truck tires. In addition, it is clear that the method of manufacture is such that the twisting and coiling of the wire does not weaken the strands. The resulting coil has greater strength in the tread of the tire than would a coil formed of two twisted-together strands if each of said strands were approximately equal in diameter to the smaller dimension B of the strands used in the present invention.

Fig. 7 shows one modified form of strand which may be used instead of the strand shown in Figs. 3 to 6. The modified form of wire is diamond-shaped in transverse cross-section and has two transversely opposed longitudinally extending knife edges 13'. The breadth A' and thickness B' may be the same as the breadth A and thickness B of the principal form. The modified form of wire is twisted and then coiled in the same manner as heretofore described in connection with the principal form of the invention, and similar traction characteristics are imparted to tires by using wire of the shape of Fig. 7.

Various changes and modifications may be made without departing from the spirit of the invention, and all of such changes are contemplated as may come within the scope of the claim.

What I claim is:

A coil for use in the manufacture of non-skid tire treads comprising a single strand of wire in coiled form, said strand having substantially greater transverse width than thickness to provide broad transverse faces and said faces having opposed knife edges, the cross-section of said strand tapering transversely in both directions from a maximum thickness midway of its width toward said knife edges, said maximum thickness being less than one-half the transverse width of the strand, said strand being loosely twisted on itself, and there being circumferentially spaced portions of each convolution of the coil where the transverse axes of said broad face portions extend in the same general direction as the axis of the coil, the strand being bent on said transverse axes, there being a 180° twist in the strand between each of said bends to project said knife edges outwardly and thereby provide knife-edge traction promptly after the tire is put into use and before the coil has been worn into a multiplicity of staples.

References Cited in the file of this patent

UNITED STATES PATENTS

| | | |
|---|---|---|
| 383,328 | Sweet | May 22, 1888 |
| 1,159,244 | Midgley | Nov. 2, 1915 |
| 2,400,690 | Fisk | May 21, 1946 |
| 2,557,945 | Crooker | June 26, 1951 |
| 2,600,534 | Hawkinson | June 17, 1952 |
| 2,610,357 | Hawkinson | Sept. 16, 1952 |